United States Patent [19]

Vanderford, Jr.

[11] 4,381,114
[45] Apr. 26, 1983

[54] PACKOFF AND SEAL RING ASSEMBLY WITH INJECTED PLASTIC PACKING

[75] Inventor: Delbert E. Vanderford, Jr., Houston, Tex.

[73] Assignee: Cameron Iron Works, Inc., Houston, Tex.

[21] Appl. No.: 324,125

[22] Filed: Nov. 23, 1981

[51] Int. Cl.³ .................... F16J 15/46; F16L 17/02
[52] U.S. Cl. ............................. 277/34.6; 277/1; 277/226; 285/96; 285/297
[58] Field of Search ............... 277/1, 34, 34.3, 34.6, 277/226, 237; 285/96, 97, 294, 297

[56] References Cited

U.S. PATENT DOCUMENTS

| | | | |
|---|---|---|---|
| 2,099,722 | 11/1937 | Byers | 277/226 X |
| 3,258,271 | 6/1966 | Hollingsworth | 277/34.3 X |
| 3,860,270 | 1/1975 | Arnold | 285/96 X |
| 4,153,656 | 5/1979 | Bunyan | 277/1 X |

FOREIGN PATENT DOCUMENTS 2810238  9/1978  Fed. Rep. of Germany ...... 285/297

*Primary Examiner*—Robert S. Ward, Jr.
*Attorney, Agent, or Firm*—Vinson & Elkins

[57] ABSTRACT

A packoff for sealing between an external cylindrical surface and a member therearound having a resilient ring, metal seal rings on the end surfaces of the resilient ring, the exterior of the resilient ring being concave to provide an annular recess, means for injecting and pressurizing plastic packing in said annular recess to cause sealing engagement of said metal seal rings and means to prevent leakage of pressure from the annular recess, and the inner and outer flanges on said metal seal rings providing a metal-to-metal seal.

28 Claims, 5 Drawing Figures

PACKOFF AND SEAL RING ASSEMBLY WITH INJECTED PLASTIC PACKING

BACKGROUND

The pressure, temperature and chemical conditions in many oil and gas wells are such that considerable difficulty has been experienced in prior packoff and seal ring structures for sealing around tubing, casing or a mandrel in oil and gas wells. Resilient seals have been subject to permeation problems, extrusion and breakdown when subjected to the elevated temperatures and high pressures encountered in such wells. Further, many of such wells contain fluids and gases which may chemically attack the resilient material of such seals.

Use of metal-to-metal seals in such applications has required selective sizing with respect to the outside diameter of the inner sealing surface.

Most current seals are resilient seal rings which require an anti-extrusion device but anti-extrusion devices, such as shown in U.S. Pat. No. 4,219,204 are not applicable when there is a large range of gap widths to be bridged. Such range results from allowed tolerances in the manufacture of oil field tubular goods. Further, such seals cannot be reenergized without internal manipulation.

U.S. Pat. No. 3,797,864 discloses a seal for a casing hanger including a resilient ring with metallic end rings and having marginal lips which are moved into sealing engagement by axial compression exerted on the resilient ring. However, such construction, while possibly providing sufficient backup to prevent extrusion, does not establish a true metal-to-metal seal.

A prior valve seat seal is disclosed in U.S. Pat. No. 2,457,493 which includes a rubber seat ring having metal confining rings at the upper and lower outer corners of the rubber seat ring. However, it is not clear how this valve construction could suggest a solution to the present problem.

SUMMARY

The present invention relates to an improved seal or packoff for sealing around well casing, tubing and mandrels in oil and gas wells. It includes a seal ring assembly having a resilient seal ring with specially formed metal seal rings on its end surfaces extending a substantial amount onto its inner surface and a concave outer surface coacting with the surrounding surface of a recess in an outer member to provide an annular space together with means for injecting and pressurizing plastic packing in said recess. The metal seal rings are energized by the resilient ring when the annular space is exposed to pressurized plastic packing to cause the metal seal rings to seal against the exterior of the casing, tubing or mandrel and also to seal against the sides of the recess in which it is mounted. In the preferred form of the seal ring assembly the metal seal rings have a central portion on the end of the resilient seal ring and flanges on the inner and outer surfaces of the resilient seal ring to seal against the inner, outer and side surfaces of the recess in which the seal ring assembly is positioned and the sealing of outer lips on the surrounding surface provides a means for preventing leakage of the plastic packing from the annular space.

An object of the present invention is to provide an improved seal or packoff around well casings, tubings or mandrels which has a long life even when subject to elevated temperature and pressures and to chemical attack.

Another object is to provide such an improved seal which can be externally energized as often as desired.

A further object is to provide an improved seal for such application which is not subject to extrusion, permeation or breakdown.

Still another object is to provide an improved seal for such application which provides a long life, a positive metal-to-metal seal against outer cylindrical surfaces of bodies which have minor surface irregularities and a wide variation of diameters of such surfaces.

BRIEF DESCRIPTION OF THE DRAWINGS

These and other objects and advantages of the present invention are hereinafter set forth and explained with reference to the drawings wherein.

DESCRIPTION OF THE PREFERRED EMBODIMENTS

Figure 1:
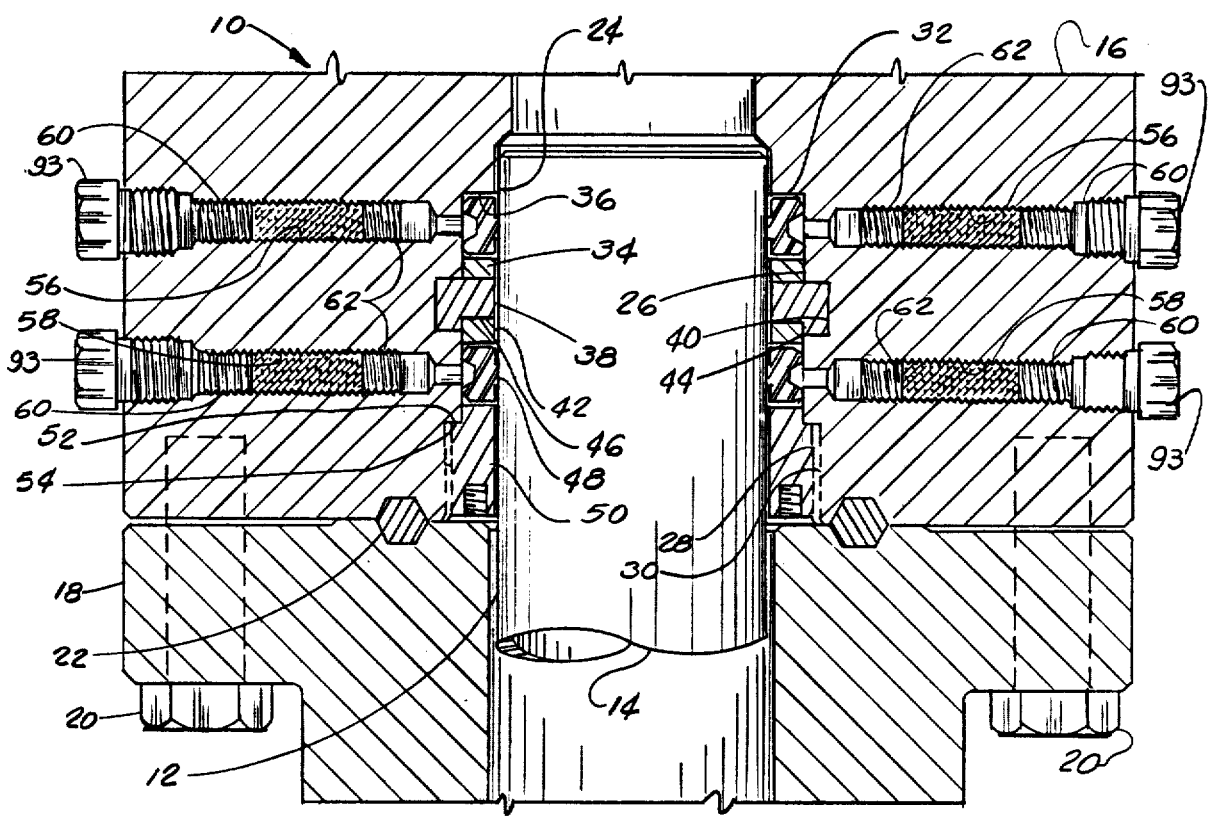
FIG. 1 is a sectional view of a dual seal structure around a tubular well member.

A preferred improved seal or packoff device 10 is illustrated in FIG. 1 for sealing between cylindrical exterior surface 12 of first tubular member or casing 14 and suitable sealing surfaces as hereinafter described on outer or second member 16. Member 16 may be a thick flange or a spool or any other structure connected to wellhead flange 18 by screws 20 as shown. Seal ring 22 seals between member 16 and flange 18.

Member 16 includes bore 24 therethrough in which the upper end of casing 14 is positioned, first counterbore or recess 26 and second counterbore or recess 28 which is provided with internal threads 30 as shown. First or upper seal ring assembly 32 is positioned around tubular member 14 in the upper end of counterbore 26 abutting ring 34 and shoulder 36 which is between bore 24 and counterbore 26. Ring segments 38 are seated in groove 40 to retain seal ring assembly 32 in its desired position. Ring 42 is positioned in counterbore 26 within annular extension 44 depending from ring segments 38 and abutting shoulder 46 of segments 38.

Second or lower seal ring assembly 48 is positioned around casing 14 below ring 42. Annular nut 50 is threaded into counterbore 28 in threads 30 until its shoulder 52 engages shoulder 54 between counterbores 26 and 28 and retains seal ring assembly 48 in position.

Passages 56 and 58 extend through member 16 to communicate with the exterior of seal ring assemblies 32 and 48, respectively. Each of such passages is provided with a chamber in which a supply of plastic packing may be placed, a means, such as ram 60, to force the plastic packing inward and to pressurize the plastic packing surrounding its seal ring assembly and means, such as check valve 62, to prevent leakage of plastic packing back into the passage. Such injection means may be similar to that shown in U.S. Pat. No. 2,491,599.

Figure 2:
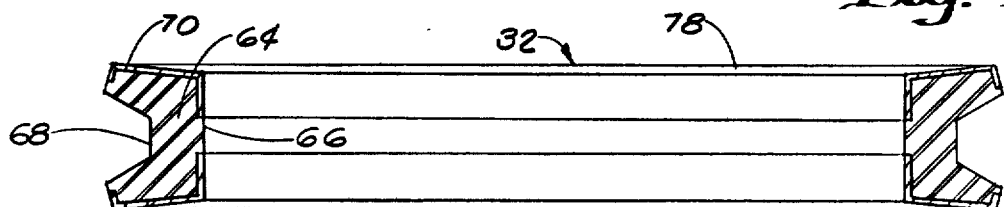
FIG. 2 is a sectional view of the modified form of seal ring assembly shown in FIG. 1.
Figure 3:
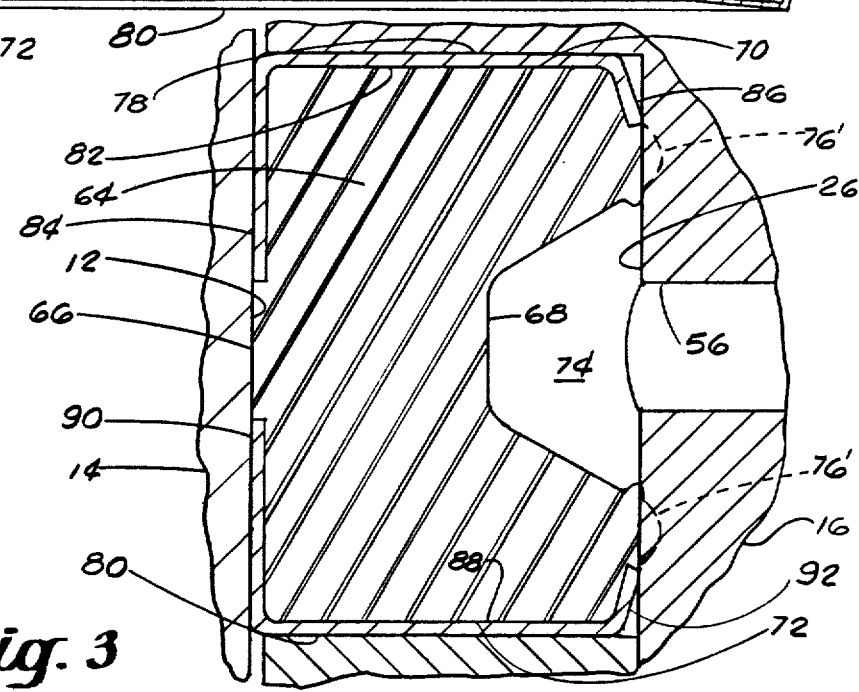
FIG. 3 is an enlarged detail sectional view of the right side of the seal ring assembly shown in FIG. 2 in installed position.
Figure 4:
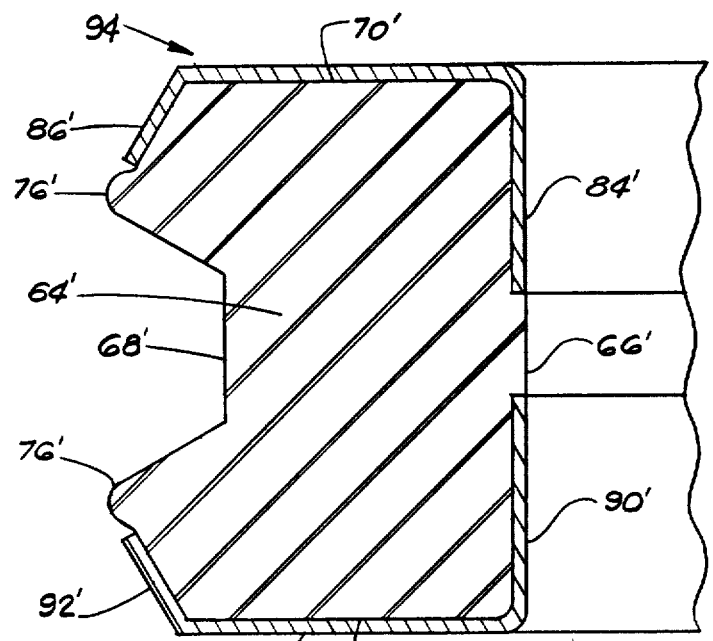
FIG. 4 is an enlarged detail sectional view of the left side of the preferred form of seal ring assembly of the present invention before installation.

Seal ring assembly 32 shown in FIGS. 2, 3 and 4 is identical to seal ring assembly 48 and includes resilient ring 64 having inner and outer surfaces 66 and 68 and upper and lower ends 70 and 72. Outer surface 68 is concave as at 74 to receive plastic packing to actuate or energize seal ring assembly 32 into sealing position as hereinafter explained. If desired, outer surface 68 may be substantially flat and recess 26 may have a groove therein to provide the space into which the plastic packing is injected.

In its relaxed form as shown in FIG. 3 in dashed lines and in FIG. 4, resilient ring 64 includes lips 76 projecting outward at each side of concavity 74 to ensure initial sealing contact with recess 26 and provide a means of preventing leakage. It is preferred that lips 76 extend sufficiently to provide an interference fit of approximately 0.010 of an inch. Seal ring assembly 32 also includes upper metal seal ring 78 and lower metal seal ring 80 embedded in or bonded to resilient ring 64.

As best seen in FIG. 2, upper and lower ends 70 and 72 of resilient ring 64 diverge outwardly and rings 78 and 80 which are relatively thin metal, such as 316 annealed stainless steel, diverge outwardly at the same angle as ends 70 and 72. Upper metal seal ring 78 includes central portion 82, inner flange 84 and outer flange 86. Lower metal seal ring 80 includes central portion 88, inner flange 90 and outer flange 92. Central portions 82 and 88 engage ends 70 and 72 respectively. Flanges 84 and 90 are inset in inner surface 66 and have their inner surfaces generally parallel with inner surface 66 as shown. Outer flanges 86 and 92 diverge outwardly from a perpendicular to their respective central portions.

Plastic packing which is in common use in the oil and gas industry is inserted into passages 56 and 58 as a cylindrical solid and rams 60 are threaded into passages to force the plastic packing into concavity or space 74 surrounding seal ring assemblies 32 and 48. As rams 60 are moved inward the plastic packing pressures resilient rings 64. Resilient rings 64 are of a material which transmits the pressure of the plastic packing to metal seal rings 78 and 80 as described above. Plugs 93 are threaded into the outer ends of passages 56 and 58 to close them during normal operations. Check valves 62 also provide a means of preventing leaking.

As shown in FIG. 1, a pair of improved seal ring assemblies 32 and 48 are included to seal between tubular member 14 and outer member 16. In this structure seal ring assemblies 32 and 48 include outer metal flanges 86 and 92 for sealing against the surface of recess 26 to prevent leakage of the pressurized plastic packing.

Seal ring assembly 94, shown in FIG. 4, is substantially the same structure as assemblies 32 and 48 except that ends 70' and 72' do not diverge as do ends 70 and 72.

Figure 5:
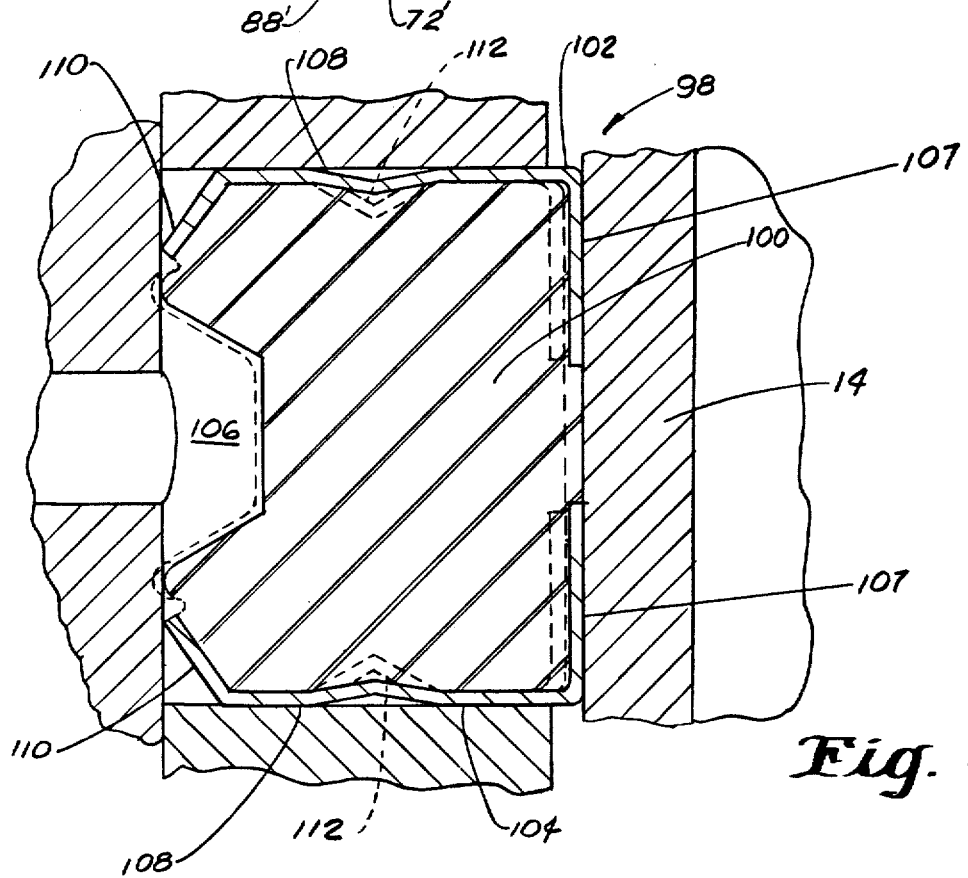
FIG. 5 is an enlarged detail sectional view of the left side of another form of seal ring assembly of the present invention installed with its free position shown in dashed lines.

Another modified seal ring assembly 98 is shown in FIG. 5 which includes resilient ring 100 having a concave exterior and upper and lower metal seal rings 102 and 104. The exterior surface of resilient ring 100 is concave to provide an annular recess 106 for the injection of plastic packing. Rings 102 and 104 each include central portions 108, inner flange 107 and outer flange 110. Central portions 108 are each indented to provide a concave or groove-shape portion 112 as shown in dashed lines. It is believed that this shape provides some additional strength to seal ring assembly 98. When exposed to sealing pressures of the plastic packing, metal seal rings 102 and 104 are believed to move to the solid line position shown in FIG. 5.

With the improved seal of the present invention, sealing is provided around casing having a gap of approximately 1/32 inch on a five inch diameter casing. It is preferred that the tolerance in the height of the groove in which the improved seal ring assembly is to be installed be plus or minus 0.005 inch of the free height of the seal ring assembly. Also, the annular recess surrounding the resilient ring should be sufficiently large to allow the plastic packing to exert a substantially uniform pressure on the resilient ring. The use of two injection passages into each annular recess assists in providing a uniform plastic packing pressure exerted on the resilient ring.

It is contemplated that effective sealing will be provided by the improved structure of the present invention for temperatures up to 250° F. and for pressures up to 22,500 psi. Such structure also accommodates variations in diameter of the internal member and will seal even when there is some shifting of the internal member with respect to the bore of the external member.

What is claimed is:

1. A packoff for sealing an annulus around a tubular member comprising
an outer member having an annular recess on its inner surface,
a seal ring assembly in the recess including a resilient ring having inner and outer surfaces and end surfaces and a pair of metal seal rings on said end surfaces with flanges extending on said inner surface, and
means on the outer member for injecting plastic packing into said recess,
said injecting means pressurizing the seal ring assembly in said recess sufficiently to ensure sealing engagement of said metal seal rings with said tubular member.

2. A packoff according to claim 1 wherein
said injecting means includes a passage in said outer member.

3. A packoff according to claim 1 wherein said metal seal rings each have sealing flanges on the outer surface of said resilient ring which sealing flanges engage said outer member to provide means for preventing leakage of pressure from said recess.

4. A packoff according to claim 1 wherein said outer member has a second annular recess on its inner surface, and includes
a second such seal ring assembly in the second recess, and
means for injecting plastic packing into said second recess,
said injecting means pressurizing the second seal ring assembly sufficiently to ensure sealing engagement of said second pair of metal seal rings with said tubular member.

5. A packoff according to claim 1 wherein the exterior of said resilient ring is concave to confront the outer wall of the recess.

6. A packoff according to claim 1 wherein
said injecting means is operable from the exterior of said outer member.

7. A seal comprising
a first member having an external cylindrical surface, a second member surrounding said first member and having a bore, a counterbore and a shoulder therebetween, a seal ring assembly positioned within said counterbore against said shoulder and including a resilient ring having inner and outer surfaces and end surfaces and a pair of metal seal rings on the end surfaces of said resilient ring, means for retaining said sealing ring assembly against said shoulder, the outer surface of said resilient ring being partially spaced from said counterbore to provide an annular space, means for injecting plastic packing into said annular space, and means for preventing pressure exerted on said plastic packing from leaking away from said annular recess, said injecting means pressurizing the plastic packing in said recess sufficiently to ensure sealing engagement of said metal seal rings between said first member and said second member.

8. A seal according to claim 7 including a passage in said second member in communication with said recess, said injecting means being positioned in said passage.

9. A seal according to claim 7 wherein said metal seal rings each have sealing flanges on the outer surface of said resilient ring which sealing flanges engage said second member to provide means for preventing leakage of pressure from said recess.

10. A seal according to claim 8 including a check valve positioned in the inner end of said passage to allow flow of plastic packing into said recess and to provide means for preventing leakage of pressure from said recess.

11. A seal according to claim 7 including means providing a second shoulder within said counterbore, a second seal ring assembly positioned within said counterbore against said second shoulder and having a second resilient ring with inner and outer surfaces and end surfaces and a second pair of metal seal rings on the end surfaces of said second resilient ring, means for retaining said sealing ring assembly against said second shoulder, the outer surface of said second resilient ring being partially spaced from said counterbore to provide a second annular recess, means for injecting plastic packing into said second annular recess, and means for preventing pressure exerted on said plastic packing from leaking away from said second recess, said injecting means pressurizing the plastic packing in said second recess sufficiently to ensure sealing engagement of said second pair of metal seal rings between said first and second members.

12. A seal according to claim 7 wherein the exterior of said resilient ring is concave to form at least a part of said annular recess.

13. A seal according to claim 8 wherein said injecting means includes a ram threaded in said passage so that on rotation to thread said ram inward said plug injects plastic packing into said recess and pressurizes the plastic packing.

14. A seal according to claim 7 wherein said injecting means is operable from the exterior of said second member.

15. A seal according to claim 7 wherein said metal seal rings include a central portion positioned on the end surfaces of said resilient ring, an inner flange on the inner surface of said resilient ring, and an outer flange on the outer surface of said resilient ring.

16. A seal ring according to claim 15 wherein said inner flanges are recessed into the inner surface of said resilient ring.

17. A seal according to claim 15 wherein said central portions of said metal seal rings are concave.

18. A seal according to claim 15 wherein said central portions of said metal seal rings diverge outwardly and said inner flanges terminate in spaced relationship to each other.

19. A seal according to claim 15 wherein said outer flanges converge outwardly.

20. A seal according to claim 15 wherein the plane of said central portions are substantially perpendicular to the axis of said first member, and said inner flanges are substantially parallel to the exterior surface of said first member.

21. A seal according to claim 9 wherein said resilient ring has a concave outer surface and the portions of said resilient ring at each side of the concavity and beyond the ends of said outer flanges extend radially outward beyond the ends of said outer lips to provide an initial seal for said recess.

22. A seal ring assembly for sealing between the cylindrical exterior surface of a first member and a surface on a second member surrounding said first member comprising a resilient ring having inner and outer surfaces and side surfaces, and a pair of metal seal rings on the end surfaces of said resilient ring, the exterior of said resilient ring being concave to receive plastic packing for energizing said resilient ring and said metal seal rings into sealing engagement.

23. A seal ring assembly according to claim 22 wherein said metal seal rings include a central portion positioned on the end surfaces of said resilient ring, an inner flange on the inner surface of said resilient ring, and an outer flange on the outer surface of said resilient ring.

24. A seal ring assembly according to claim 23 wherein said inner flanges are recessed into the inner surface of said resilient ring.

25. A seal ring assembly according to claim 22 wherein said central portions of said metal seal rings are concave.

26. A seal ring assembly according to claim 22 wherein said central portions of said metal seal rings diverge outwardly and said inner flanges terminate in spaced relationship to each other.

27. A seal ring assembly according to claim 23 wherein said outer flanges converge outwardly.

28. A seal ring assembly according to claim 23 wherein the plane of said central portions are substantially perpendicular to the axis of said first member, and said inner flanges are substantially parallel to the exterior surface of said first member.

* * * * *